(12) United States Patent
Pepper et al.

(10) Patent No.: US 6,819,432 B2
(45) Date of Patent: Nov. 16, 2004

(54) COHERENT DETECTING RECEIVER USING A TIME DELAY INTERFEROMETER AND ADAPTIVE BEAM COMBINER

(75) Inventors: David M. Pepper, Malibu, CA (US); Gilmore J. Dunning, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 198 days.

(21) Appl. No.: 09/808,472

(22) Filed: Mar. 14, 2001

(65) Prior Publication Data

US 2002/0131050 A1 Sep. 19, 2002

(51) Int. Cl.$^7$ ................................................. G01B 9/02
(52) U.S. Cl. ........................................ 356/498; 356/502
(58) Field of Search .............................. 356/502, 477, 356/492, 35.5, 498; 73/655, 657

(56) References Cited

U.S. PATENT DOCUMENTS

| | | | | |
|---|---|---|---|---|
| 4,572,949 A | * | 2/1986 | Bowers et al. | 250/227 |
| 4,966,459 A | * | 10/1990 | Monchalin | 356/358 |
| 5,080,491 A | * | 1/1992 | Monchalin et al. | 356/352 |
| 5,131,748 A | * | 7/1992 | Monchalin et al. | 356/486 |
| 5,684,592 A | | 11/1997 | Mitchell et al. | 356/357 |
| 5,894,531 A | * | 4/1999 | Alcoz | 250/227.27 |
| 5,900,935 A | | 5/1999 | Klein et al. | 356/347 |
| 5,909,279 A | | 6/1999 | Pepper et al. | 356/345 |
| 6,057,911 A | * | 5/2000 | Reich | 356/35.5 |
| 6,075,603 A | * | 6/2000 | O'Meara et al. | 356/358 |

OTHER PUBLICATIONS

Pepper, D.M., et al., "Nonlinear optical adaptive photodetectors for remote sensing: Application to ultrasound detection," Nonlinear Optics '98: Materials, Fundamentals and Applications Topical Meeting, pp 444–446 (Aug. 1998).

* cited by examiner

Primary Examiner—Stephone B. Allen
(74) Attorney, Agent, or Firm—Ladas & Parry LLP

(57) ABSTRACT

An optical apparatus for coherent detection of an input optical beam. The apparatus includes a beam splitter for splitting the input optical beam into a first component and a second component; an optical delay device arranged to receive the second component, the optical delay device imposing an intentional delay in the second component of the input optical beam; and an adaptive beam combiner coupled to receive the second component with a delay imposed thereon by the optical delay device; and the first component from the beam splitter. The adaptive beam combiner has two exiting components having the same wavefronts and propagating directions as the first and second components and being in quadrature. A detector arrangement is provided for receiving and detecting the first and second exiting components from the adaptive beam combiner.

20 Claims, 3 Drawing Sheets

Time-delay fiber-based coherent detection system using an adaptive beam combiner (a two-wave mixer).

Time-delay fiber-based interferometeric receiver
using a photo-emf sensor

Time-delay fiber-based coherent detection
system using an adaptive beam combiner (a two-wave mixer).

Dual-fiber time-delay line system using a photo-emf sensor

Time-delay fiber-based coherent detection
system using an adaptive beam combiner (a two-wave mixer).

US 6,819,432 B2

COHERENT DETECTING RECEIVER USING A TIME DELAY INTERFEROMETER AND ADAPTIVE BEAM COMBINER

TECHNICAL FIELD

The present invention relates to an optical detector which is effective for detecting phase modulated signals in a light beam, but which is relatively insensitive to noise induced when the light beam traverses an aberrant path, caused by (i) a turbulent atmosphere, (ii) relative platform motion or (iii) other artifact which induces a relatively low frequency aberration of the signal. The aberrations can range from near DC to hundred's of kilohertz while the desired phase encoded data or other information may fall into the multi-GHz range. The present invention may be used in a number of applications and methods, including machines and methods for the testing of materials, communication systems and methods, etc.

BACKGROUND AND ADVANTAGES OF THE INVENTION

The optical detector of the present invention can be used in laser communication, remote sensing, and nondestructive testing applications. Remote sensing and high-bandwidth (multi-GHz) optical communication receivers have a need for an optical detector which can operate under conditions of extreme beam wander, static and dynamic optical distortions (turbulence, speckle, modal dispersion in multi-mode fibers), and/or relative platform motion. A dual-fiber system can be used for applications where secure links are required, with low probability of interception and detection.

In the manufacturing arena, there is a need for optical testing and process control of critical components. Laser-based ultrasound (LBU) represents a viable approach to satisfy these needs, and while prior art photo-emf sensors can form an important component in such diagnostic systems, the present invention will enable such sensors to perform with even better performance. LBU systems can significantly decrease the inspection time and increase reliability, and when the present invention is utilized, it can operate in adverse factory environments, in addition to a strictly controlled laboratory environment. This is due to the fact that the present invention can compensate for in-factory vibrations, relative platform motion, and/or variations in the temperatures and concentration of particles.

The prior art includes single-mode optical fiber delay lines, which are suitable for single-spatial mode optical channels (e.g., fiber networks, etc.) Such prior art systems do not function with any reasonable efficiency, particularly in the case of multi-mode beams.

In terms of multi-spacial mode systems, the prior art includes Fabry Perot interferometers, which are bulky, expensive (especially if one has large field of view needs), and require servo-control for optical phase-biasing.

The prior art includes U.S. Pat. No. 5,900,935 to Klein et al., which discloses a homodyne interferometer. In this prior art system, an optical beam is directed via two paths to a holographic element. One of the paths includes a sample, off which the optical beam is reflected. The optical lengths of the two paths must be kept less than the coherence length of the laser used to illuminate the sample. This restriction imposes strict limitations on the distance from the testing apparatus to the sample.

The present invention replaces the bulky prior art interferometer with a compact, multi-mode fiber delay line, integrated with a real-time wavefront matching element, which is automatically biased (so no servo control system is required) for maximum quadrature detection.

The prior art also includes isolated two-wave mixers as well as isolated double-pumped phase-conjugate mirrors, both used as real-time beam clean-up (or wavefront matching) elements; these systems degrade in performance in the case of large-amplitude phase excursions, since the real-time grating can experience erasure.

The prior art further includes the integration of a multi-mode optical fiber time-delay line 125 with a photo-emf sensor 139 (see FIG. 1 and U.S. Pat. No. 5,684,592). This compact system can also coherently detect highly aberrated, multi-spatial-mode beams. But, the bandwidth of the photo-emf sensor is limited to about 100 MHz, which limits the system's utility for use in many communication systems, where multi-GHz bandwidth channel capacity may be well required. Moreover, the detection sensitivity is electronic-noise limited and is about an order of magnitude less sensitive than the shot-noise limit.

The present invention overcomes all theses limitations, by integrating a high-performance adaptive optical combined element, with a multi-spatial-mode fiber delay line. Moreover, by using a pair of such delay lines, a short-coherence length source can be used; the prior art in this respect involves a photo-emf sensor, which is integrated with the dual-fiber delay line (see FIG. 3). Therefore, the net system is limited in detection bandwidth. Finally, the multi-mode optical fiber delay line can be in the form of an amplifying multi-mode optical fiber (e.g., Er-doped glass), for added gain. The present invention will provide robust sensors which can perform in a variety of adverse industrial conditions, including the use of short-coherence sources, extreme (i.e., many optical wavelengths of) workpiece wobbling and beam wander, low-reflectivity workpieces (e.g., or other propagation path losses), and laser amplitude fluctuations (due to workpiece reflectivity changes, wobbling, etc.). The present invention also provides robust sensors for remote sensing and laser communications applications in which the sensor must tolerate fluctuations in received intensity levels."

BRIEF DESCRIPTION OF THE INVENTION

Briefly, and in general terms, the present invention provides an optical apparatus for coherent detection of an input optical beam. The apparatus includes a beam splitter for splitting the input optical beam into a first component and a second component; an optical delay device arranged to receive the second component, the optical delay device imposing an intentional delay in the second component of the input optical beam; and an adaptive beam combiner coupled to receive the second component with a delay imposed thereon by the optical delay device; and the first component from the beam splitter. The adaptive beam combiner has two exiting components which have the same wavefronts and propagating directions as the first and second components and which are in quadrature. A detector arrangement is provided for receiving and detecting the first and second exiting components from the adaptive beam combiner.

DETAILED DESCRIPTION OF THE PREFERRED EMBODIMENTS

Figure 2:
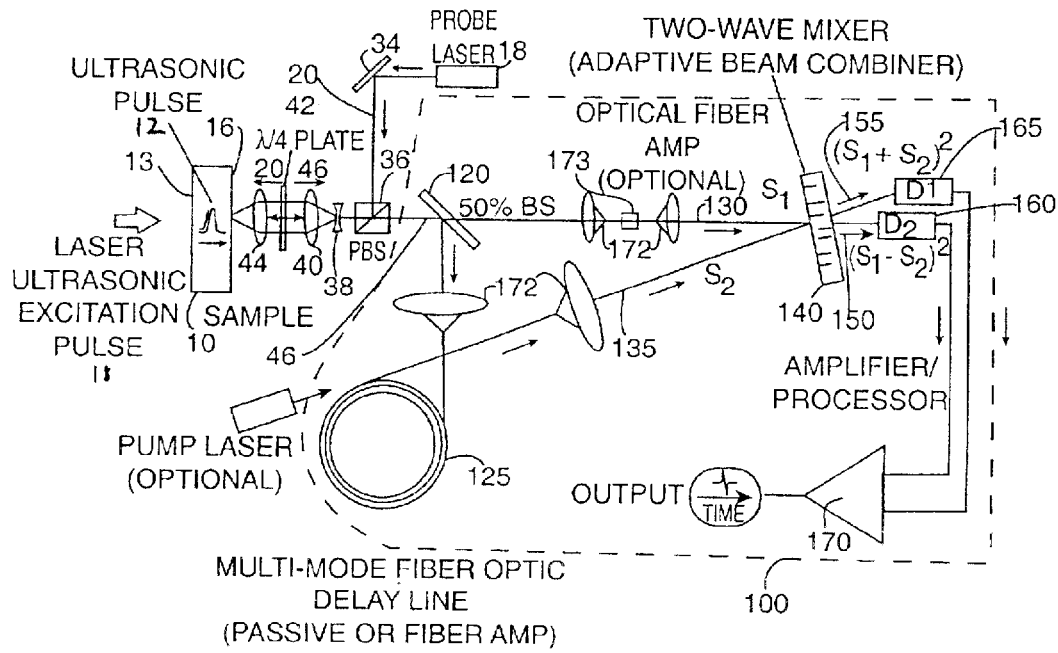
FIG. 2 is a time-delay fiber-based coherent detection system using an adaptive beam combiner as a two wave mixer.

A first embodiment of the invention, as shown in FIG. 2, has four basic elements: (1) an optical source, such as a laser 18; (2) a multi-mode optical fiber delay line 125, which is sometimes referred to as a detection delay line herein; (3) a pair of conventional photodetectors 160, 165; and (4) an adaptive beam combiner 140. A second embodiment of the invention includes additional optical elements: (1) a second optical-fiber delay line, which is sometimes referred to as a transmission delay line herein which need not match the number of spatial modes as the first (i.e., the detection) delay line; and (2) a fiber amplifier, which can be used in either leg or both legs of the detection time-delay line.

The multi-mode optical fiber delay line 125 can be a passive delay line or it can be provided by a multi-mode optical fiber amplifier. In one embodiment of the delay line, the delay is caused by a prescribed length of a multi-mode optical fiber, which serves as the delay line. In another embodiment, this fiber can be in the form of an amplifying optical element, so that the signal can be enhanced as the beam traverses the fiber. As an example, the fiber can be an erbium-doped fiber amplifier (EDFA), with a length necessary to provide for noise suppression and signal enhancement (see below for choice of fiber length). The fiber amplifier, if used, also requires an optical pump source (typically, a laser diode or a fiber laser). In yet another embodiment the delay line comprises a set of multi-mode fiber loops, with each loop of the set connecting the same points, and, additionally, with each loop having a different physical length. The loop of choice can be electro-optically switched into place. The choice of which loop to switch will depend on the desired ultrasound frequency of operation as well as the maximum cutoff frequency of the background phase noise to be suppressed by the system.

The length of the fiber should be greater than the time it takes the ultrasound signal (with the minimum signal frequency component) to travel through the fiber. In addition, the fiber length should be less than the time it takes the phase noise (with the highest noise frequency component) to travel through the same length of fiber. Since the desired ultrasound frequency range is typically on the order of 100 kHz to 1 GHz, this means that the fiber length (L=(c/n)t where c is the speed of light, t is the inverse of the lowest frequency component and n is the effective refractive index of the guided mode in the optical fiber) should be in the range of about 2 km to 20 cm, respectively, or greater. Also, since the noise frequency components range from <1 Hz to about 50 kHz, the fiber length should be in the range of less than 4 km. Thus, both of these conditions can be met simultaneously. In all these cases, the fibers, be they passive or active (e.g., EDFAs), are available commercially. The optional fiber switching network (in the case of a set of fiber loops) is also available.

In a third embodiment, which will be described with reference to FIG. 4, the optical source 19 is not provided by laser 18 (which can be omitted), but rather the optical source 19 might be a transmitter of an optical communication system for transmitting data optically. Of course, a suitable laser would likely be used as a component of the optical communications system transmitter.

The first embodiment of the invention will be described in connection with a system and method for detecting ultrasound using time-delay interferometry. However, the invention is not limited to this application as it can also be utilized in other applications, such as communication systems, for example.

The laser 18 of the first embodiment (see FIG. 2) probes a region of space 16 (such as a remote fiber sensor, a high-bandwidth phase modulator, or a vibrating surface of a workpiece 10 in non-destructive testing) which encodes phase modulation information onto the laser beam. The frequency of the modulation can range from the MHz range to the multi-GHz range, with depth-of-phase excursions in the range of several wavelengths to fractions of a wavelength (down to 0.001 wavelength or smaller). The laser beam may have traversed a highly aberrated path (which can induce beam wander, speckle, etc.), such as a turbulent atmosphere, a highly aberrated plate, a multi-mode optical fiber sensor, or relative platform motion, all of which cause noise. This noise can be in the form of millions of spatial modes or speckle. The time scale of the aberrations can range from near-DC to hundreds of KHz, with phase excursions in the range of several waves to millions of waves.

When used in the application of non-destructive testing at a workpiece 10, the probe beam 20 from laser 18 is directed by mirror 34 to a beam director 36, preferably a polarizing beamsplitter (PBS), that transmits one polarization component and reflects the orthogonal component. For illustration, the polarization of the probe beam 20 is chosen so that the probe beam is reflected by PBS 36 towards surface 16. The probe beam 20 is expanded and collimated by lenses 38 and 40 and passes through a polarization rotator 42, preferably a quarter-wave plate, that converts its linear polarization to circular polarization. A focusing lens 44 focuses the probe beam 20 onto surface 16 of the work piece 10. Ultrasound pulse or waves 12 are generated in the work piece 10, preferably by impinging a laser ultrasonic excitation pulse 11 on a different surface of the work piece 10 as is more fully explained in U.S. Pat. No. 5,684,542. The focal length of lens 44 is preferably chosen so that the diameter of the probe beam 20 at the readout surface 16 is comparable to or less than the uniform part of the ultrasonically-induced surface vibration (typically 1 mm or less).

When reflected from the surface 16, the probe beam is phase modulated by the vibrations induced on the readout surface 16 by the ultrasound 12. The surface 16 is assumed to be smooth enough so that the reflected probe beam 46 substantially maintains its circular polarization. The reflected probe beam 46 passes back through lenses 44, 40 and 38, and also back through quarter-wave plate 42, which converts this circular polarization back to a linear polarization that is orthogonal to the probe beam's initial linear polarization state as it exited PBS 36. Since the polarization of the reflected beam in now rotated, this rotation allows the reflected probe beam 46 to pass through PBS 36.

Reflected beam 46 contains the desired phase modulation information, but it is very likely to be multi-spatial mode dynamically distorted due to aberrations in the path. Part of the light of beam 46 (about 50%) is beam-split by a beam splitter 120 and coupled into a multi-mode fiber delay line 125 with a number of modes comparable to, or greater than, the number of spatial modes in the incident beam. Lenses 172 are used to couple the light into and out of the optical fibers. The length of the delay line 125 is on the order of the inverse of the lowest frequency that is desired to be detected. For example, for a 10 MHz low-frequency cut-off, the fiber length would be on the order of about 20 meters (c×100 nsec/1.5). Here n=1.5 which is the approximate refractive index of the guided modes in the optical fibers. The output of the fiber delay line 125 is a delayed beam 135 which is directed to the adaptive beam combiner 140, along with a undelayed reference beam 130 from beam splitter 120. The adaptive beam combiner 140 can comprise a two-wave mixer, a double-pumped phase-conjugate mirror, or a closed-loop adaptive optical system (e.g., a spatial light modulator with a wavefront error sensor, configured into a servo-controlled geometry). In all of these cases, the two multi-mode beams 130, 135 with electric field amplitudes $S_1$ and $S_2$ respectively, are combined resulting in a wavefront-matched pair of output beams 150, 155. The beams that emerge from the beam combiner 140 can either be co-propagating plane waves, or can both emerge as aberrated waves, but with the same wavefronts and propagation direction. This pair of beams each impinge a conventional square-law photodetector 160, 165 for coherent detection. The relative phase between the pair of beams 150, 155 is set to be in quadrature (for maximum sensitivity) by the action of the adaptive beam combiner 140. As a result of this system, slowly varying distortions are, in effect, canceled out by the common-mode aspect of the delay line (i.e., the delayed line propagation time is faster than the slowly varying distortion, even if it is of large excursion), whereas the rapidly varying differential phase information is passed through the beam combiner 140, where it emerges onto one of the wavefront-matched beams. The square-law response of the detector then demodulates the phase information, resulting in the desired output signal from the detector and its amplifying stage(s). The adaptive beam combiner 140 also tracks out slowly varying non-differential phase changes, such as vibrations of the time-delay fiber (microphonics, thermal effects, etc.), as well as beam wander. Therefore, the system is very robust. Optional fiber amplifiers are shown in the detection, both the undelayed 130 and delayed 135 beams.

An adaptive beam combiner 140 is a two-wave mixer which can be in the form of a bulk photorefractive crystal (GaAs, InP, CdTe, barium titanate, BSO etc.) or a thin nonlinear mesia (photorefractive multiple quantum well (MQW) devices, polymers, etc.). In the latter case, the Bragg condition is very forgiving, so that greater than one gigahertz bandwidths can be diffracted by the real-time gratings formed in the device. In the case of semiconductors, the mobilities are relatively high, so that 100 KHz noise (dynamic variations on this order) can be tracked out, or compensated. Also, the sensitivity of these beam combiners has been shown in separate experiments to be with a factor of two of the shot-noise limit, resulting in a very sensitive, and robust coherent detector.

Figure 1:
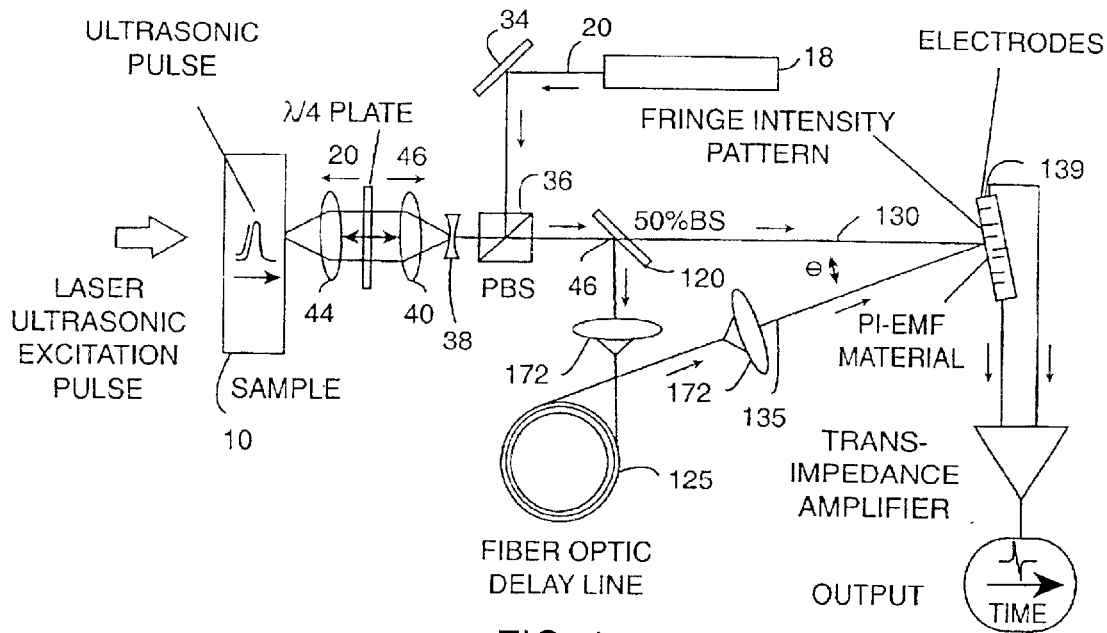
FIG. 1 is a conventional time-delay fiber-based interferometric receiver using a photo-emf sensor.

A prior art system has already been discussed (see FIG. 1), but the prior art used a photo-emf sensor 139 as the detection element, instead of the adaptive beam combiner 140 and photodetectors 160, 165 of the present invention, with the result being a reduction in detection sensitivity, and detection bandwidth compared to the present invention.

In FIG. 2 a pair of matched detectors 160, 165 are provided that each detect the combined (i.e., wavefront-matched) signals from each of the zero-order and first-order-diffracted output "ports" of the beam combiner 140, so that common-mode (additive noise) can be compensated. The outputs of the detectors 160, 165 are combined in an amplifier/processor 170. Lenses L (see FIG. 6) can be used between the adaptive beam combiner 140 and the respective detectors 160, 165 to focus the beams emanating from the adaptive beam combiner thereat.

Figure 3:
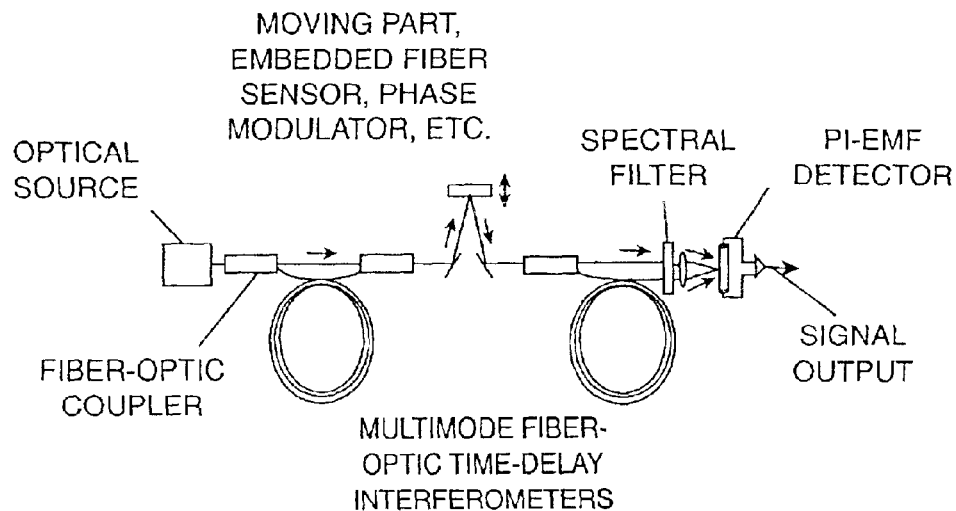
FIG. 3 shows a conventional dual-fiber time delay line system using a photo-emf sensor.
Figure 4:
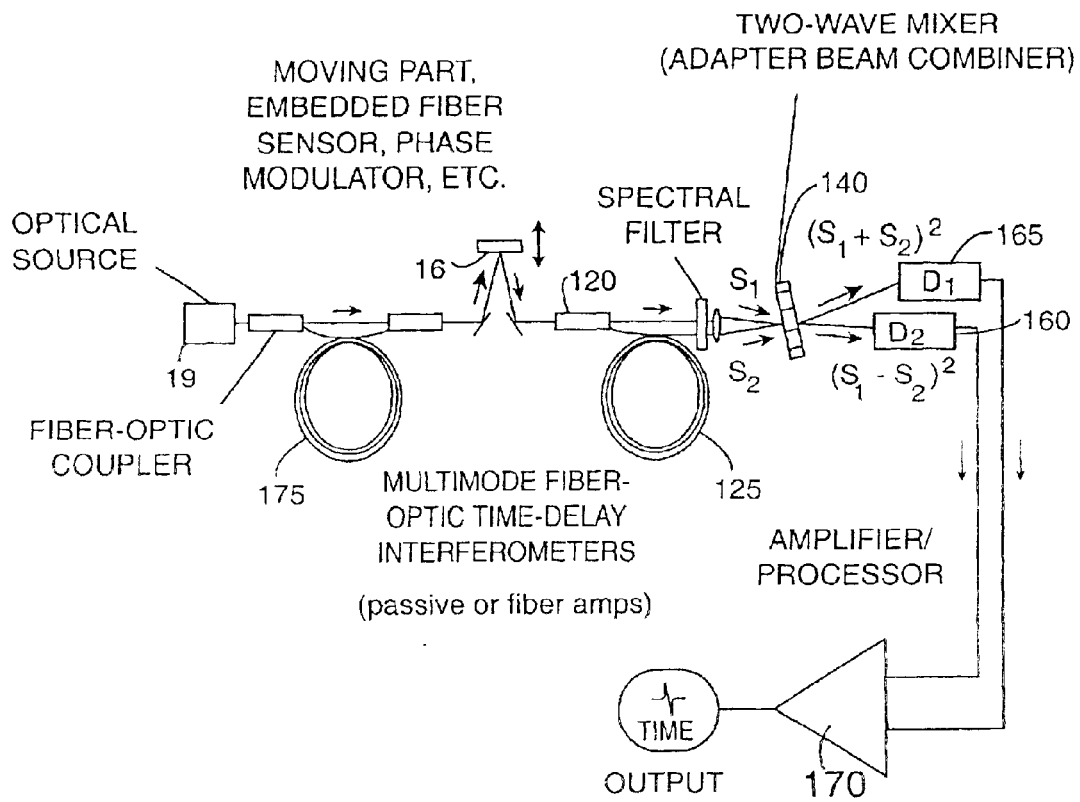
FIG. 4 is a dual-fiber time delay system using an adaptive beam combiner as a two wave mixer.

In addition to the basic system shown in FIG. 2, one can employ a second optical delay line 175 in the transmitter section in a second embodiment of the invention as depicted by FIG. 4. If the delay lines 125, 175 are matched in length (i.e. they have identical time delays), then a very short coherence length laser source 19 can be used, resulting in a lower cost of the system, as well as making it very difficult to intercept or detect. A prior art system has already been discussed (see FIG. 3), but the prior art used a photo-emf sensor as the detection element, instead of the adaptive beam combiner 140 and photodetectors 160, 165 of the present invention, with the result being a reduction in detection sensitivity, and detection bandwidth. The present invention enables higher detection sensitivity (by an order of magnitude) and bandwidth (by three orders of magnitude).

Optical amplifiers 173, as shown in FIG. 2, can be utilized if desired. For example, an optical amplifier may be used in one of the receiver legs: either in the time-delayed leg 135 in the undelayed, reference leg 130. In the former case, the multimode fiber delay line can, itself, be in the form of a multi-mode fiber amplifier. In the latter case, the undelayed leg can contain a short optical amplifier. Another variant would be for both legs 130, 135 to each contain an optical amplifier 173 for even greater performance. The advantage in this case is that the compensation bandwidth of the system will be enhanced, since the photorefractive response (of the beam-combiner device 140) is a function of the intensity of the light on the element. The disadvantage of this modification may be in added spontaneous noise and modal noise caused by the fiber amplifiers. One can, in this case, employ a single-mode fiber amplifier in the undelayed leg, and compensate for the loss of spatial modes with a higher gain amplifier; additional gain can then be used to enable the beam combining element to respond faster, with less modal spontaneous noise in the system.

Figure 5:
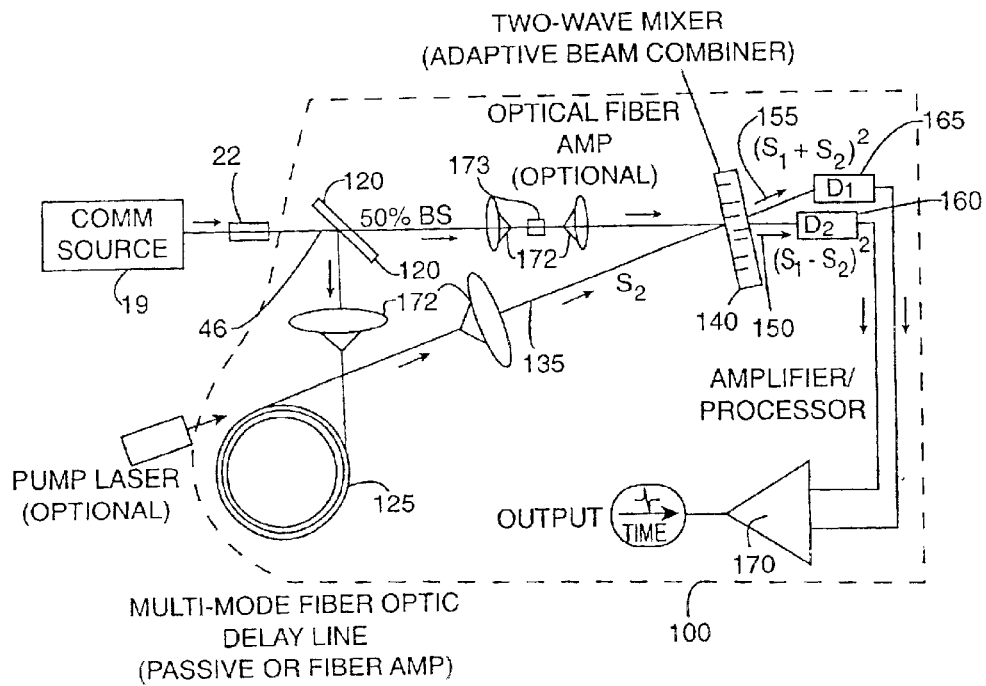
FIG. 5 is a time-delay fiber-based coherent detection system using an adaptive beam combiner as a two wave mixer in a communications application.

FIG. 5 depicts a third embodiment of the present invention. This embodiment is somewhat similar to the embodiment of FIG. 2, but in this embodiment the optical source is a source 19 which can be the transmitter, for example, of an optical communication system and the apparatus of FIG. 5, functions as a communication receiver. The received signal 21, which may be coupled via appropriate optical components such as lenses, fiber optic cables 22, etc., is conveyed to beamsplitter 120 when the received signal 21 is split into a delayed component (which transits delay line 125) and an undelayed component (which transits path 130).

The received signal may transit the atmosphere and/or transit a signal made or even a highly multi-mode fiber which can have many spatial modes (1000s to millions). In this situation, a phase modulated beam will traverse a free-space path or propagate through a highly multi-mode fiber prior to entering the receiver of FIG. 5. Since the receiver uses a time-delay leg 125 in the form of a multi-mode fiber, it can accommodate a wide field-of-view as well as many incident dynamically varying spatial modes (due to wavefront distortions through an atmospheric path, for example). The adaptive beam combiner 140, therefore sees two beams which have been encoded with the desired phase modulation as well as having become distorted by the atmosphere (or by the multi-mode fiber 22). One of the beams has been further distorted by propagating through the multi-mode fiber 125, whose length is equal to a single bit of time delay. For example, for a 1 Gb/s data rate, the fiber length of the delay line would be about 30 cm. These two distorted beams (the delayed one and the undelayed one) both strike the adaptive beam combiner 140 (which, by the way, can be in the form of a MQW or other real-time holographic coupler). The beams 150, 155 then emerge as shown in the FIG. 5, where they are detected using a common-mode rejection (dual-detector 160,165) system. By comparing the differential phase shift between the two components, the encoded data, which is phase modulated on the received signal by transmitter 19 in this example, is easily demodulated. The present invention tracks out spatial aberrations which can occur due to the atmospheric distortions, etc. The other components shown in FIG. 5 are the same as the corresponding elements shown in FIG. 2 and therefore they are not described further or in greater detail that already done.

In the embodiments of FIGS. 2, 4 and 5 the arrangement of the adaptive beam combiner 140 and photodetectors 160, 165 has been the same and indeed is based upon an implicit assumption that the beams 130, 135 impinging the adaptive beam combiner 140 are appropriately polarized. That assumption will not necessarily be correct for all embodiments. Indeed, as a general rule it may well be more often than not that the two beams 130 and 135 will not have a single polarization or may not have precisely aligned and parallel polarization states. Since two-wave mixers 140 are typically most efficient when the received beams 130 and 135 have polarizations which are parallel to each other, any departure from such purely parallel and parallel-aligned polarized beams will result in a loss of coupling efficiency and wavefront-matching capability of the two beams 150 and 155 which exit the two-wave mixer 140. Such lack of polarization parallelism can occur in a number of ways. For example, if the optical fiber 125 is not polarization preserving, its output will likely exhibit a randomized polarization. Even if the optical fiber is polarization preserving, if it and any other optical fibers are not properly aligned, then the output beams will not exhibit parallel polarization orientations, leading to coupling inefficiency in the two-wave mixer 140.

Figure 6:
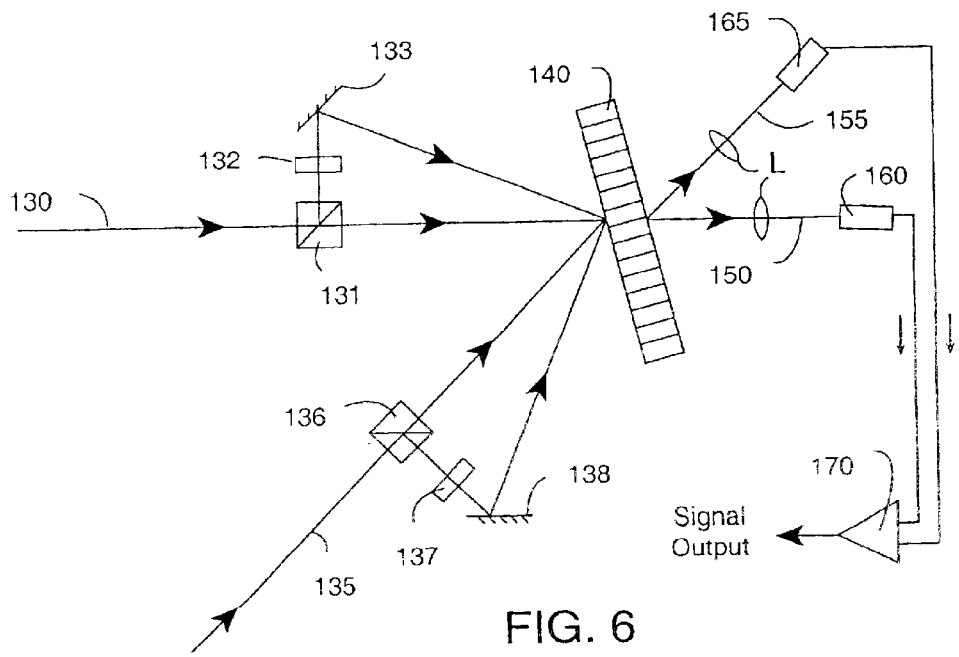
FIG. 6 depicts an alternate arrangement of an adaptive beam combiner and associated detectors.

It is possible to modify the arrangement of the adaptive beam combiner 140 and photodetectors 160, 165 as shown in FIG. 6 to ensure that the two-wave mixer or adaptive beam combiner 140 "sees" only purely polarized beams having parallel polarization states. Turning to FIG. 6, a Polarization Beam Splitter PBS and a 90° rotation element is placed in the path of each beam 130 and 135. The PBS 131 in path 130 and the PBS 136 in path 135 passes a beam of one linear polarization and reflects a beam whose linear polarization state is perpendicular (i.e. rotated by 90 degrees) with respect to the passed beam. The reflected beam is then rotated back to the same polarization as the passed beam by means of a 90° rotation element 132 associated with path 130 and a 90° rotation element 137 associated with path 135. In that way the beams exiting the 90° rotation elements have the same polarization as the passed beams exiting the PBSs. These four beams are then combined at the mixer 140 which then only "sees" beams of a common parallel polarization orientation. Mirrors or prisms 133 and 138 are used, as needed, to direct the beams to the mixer 140. Also, lenses L may be used in the various optic paths as needed. For example, lenses may well be used in between the adaptive beam combiner 140 and the associated detectors 160 and 165.

Having described the invention in connection with preferred embodiments thereof, modification will now doubtlessly suggest itself to those skilled in the art. As such, the invention is not to be limited to the foregoing disclosure, except as required by the appended claims.

What is claimed is:

1. An optical apparatus for coherent detection of an input optical beam, the apparatus comprising:
    (a) a beam splitter for splitting the input optical beam into a first component and a second component, the optical beam having information content with a minimum signal frequency component;
    (b) an optical delay device arranged to receive the second component, the optical delay device imposing an intentional delay in the second component of the input optical beam;
    (c) an adaptive beam combiner coupled to receive
        (i) the second component with a delay imposed thereon by the optical delay device; and
        (ii) the first component from the beam splitter; the adaptive beam combiner having two exiting optical components having the same wavefronts and propagating directions as the first and second components and being in quadrature; and
    (d) a detector arrangement for receiving and detecting the first and second exiting components from the adaptive beam combiner.

2. The optical apparatus of claim 1 wherein the input optical beam is provided from a source comprising:
    (e) a probe laser;
    (f) a workpiece under test which is subjected to an ultrasonic excitation pulse;
    (g) a beam director for receiving a laser beam from the probe laser and directing a first component of the laser beam towards said workpiece and directing a second component, together with the first component as reflected from the workpiece, to said beam splitter;
    (h) a quarter wave plate disposed in the path of the first component of the laser beam; and
    wherein the first component of the laser beam corresponds to the first component of the optical beam and wherein the second component of the laser beam corresponds to the second component of the optical beam.

3. The optical apparatus of claim 1 wherein the delay imposed by the optical delay device is greater than an inverse of the minimum signal frequency component.

4. The optical apparatus of claim 1 wherein the optical delay device is a length of optic fiber.

5. The optical apparatus of claim 1 wherein the input optical beam is generated by a transmitter of an optical communications system.

6. The optical apparatus of claim 1 wherein the first and second components are multi-mode beams with electric field amplitudes $S_1$ and $S_2$, respectively, and wherein the two exiting optical components from the adaptive beam combiner are beams which are respectively wavefront-matched to the first and second components impinging the adaptive beam combiner.

7. The optical apparatus of claim 6 the two exiting optical components have the same wavefronts and propagating directions as the first and second components and being in quadrature.

8. The optical apparatus of claim 6 wherein the wavefront-matched output beams that emerge from the beam combiner are either (i) co-propagating plane waves or (ii) aberrated waves having the same wavefronts and propagation direction as the first and second components impinging the adaptive beam combiner.

9. A method for detecting sonic vibrations in a test material having a test surface comprising:

(a) generating a beam of light having a wavelength;

(b) splitting said beam into a first beam and a second beam;

(c) directing said first beam onto said test surface to be scattered by said test surface with data having a minimum signal frequency component;

(d) delaying the second beam by a period of time which is greater than an inverse of the minimum signal frequency component;

(e) directing at least a portion of said scattered first beam and the delayed second beam on an adaptive beam combiner, the adaptive beam combiner emitting two beams which are in phase quadrature; and, (f) directing the beams emitted by the adaptive beam combiner onto respective photodetectors and associated circuitry to result in an electrical output signal that is representative of the vibrating test surface.

10. The method of claim 9 wherein the delaying step is preformed by a length of multi-mode optic fiber and wherein the scattered first light beam and the second light beam impinging the adaptive beam combiner are multi-mode optical beams.

11. The method of claim 9 wherein said generated beam of light is a polarized coherent light beam and wherein said first and said second beams are co-propagating and co-polarized when impinging said adaptive beam combiner.

12. The method of claim 11 wherein said first and said second beams are not co-propagating and co-polarized immediately after the second beam is delayed by the delaying step but wherein the first and second beams are independently subjected to a polarization correcting step to ensure that each of said first and second beams has the same polarization as the other beam.

13. The method of claim 9 wherein said sonic vibrations are small vibrational surface deflections.

14. The method of claim 13 wherein said sonic vibrations are on the order of ultrasonic surface vibrations.

15. An apparatus for sensing sonic vibrations on a material having a test surface, comprising:

(a) a light generating source for generating a coherent, co-polarized beam of light having a predetermined wavelength;

(b) a beam splitting apparatus for receiving said generated light beam, splitting said generated light beam into at least a first light beam and a second light beam, and for directing said first light beam to a test material test surface capable of at least scattering said first beam with data having a minimum signal frequency component;

(c) an optical delay device for delaying at least one of said first and second beams with a delay which is greater than an inverse of the minimum signal frequency component;

(d) an adaptive beam combiner having a receiving surface for receiving at least a portion of said scattered first light beam at a first angle relative to said receiving surface, and for receiving said second light beam at a second angle relative to said receiving surface which second angle is different from said first angle, for interfering said first and said second beams to introduce a phase shift difference between said first and said second beams, and for producing co-propagating light waves comprising at least a portion of said first beam and at least a portion of said second beam received by said receiving surface;

(e) photodetectors for receiving co-propagated light beams from said adaptive beam combiner; and (f) circuitry coupled to the photodetectors for producing an electrical output signal that is representative of the vibrating test surface.

16. The apparatus of claim 15 wherein the optical delay is multi-mode optic fiber and wherein the scattered first light beam and the second light beam impinging the adaptive beam combiner are multi-mode optical beams.

17. The apparatus of claim 15 further including a polarization correcting apparatus to ensure that each of said first and second beams has the same polarization as the other beam when impinging said adaptive beam combiner.

18. The apparatus of claim 17 wherein the polarization correcting apparatus includes a polarization beam splitter and a 90° beam rotator arranged in series in paths associated with said first and second light beams.

19. The optical apparatus of claim 4 wherein the optic fiber is multi-mode optic fiber and wherein the first and second components impinging the adaptive beam combiner are multi-mode optical beams.

20. A method for detecting sonic vibrations in a test material having a test surface comprising:

(a) generating a beam of light having a wavelength;

(b) splitting said beam into a first beam and a second beam, (c) directing said first beam onto said test surface to be scattered by said test surface with data having a minimum signal frequency component;

(d) delaying the second beam by a period of time which is greater than an inverse of the minimum signal frequency component;

(e) directing at least a portion of said scattered first beam and the delayed second beam on an adaptive beam combiner the adaptive beam combiner emitting two beams, which are in quadrature and respectively equal to (i) the difference of the respective optical phases of the scattered first beam and the delayed second beam and (ii) the difference of the scattered delayed second beam and the first beam, with one of the emitted beams possessing an optical wavefront equivalent to the first scattered beam and with the other of the emitted beams possessing an optical wavefront equivalent to the second delayed beam; and, (f) directing the beams emitted by the adaptive beam combiner onto respective photodetectors and associated circuitry to result in an electrical output signal that is representative of the vibrating test surface.

* * * * *